United States Patent [19]

Saitou

[11] 4,367,854
[45] Jan. 11, 1983

[54] TAPE CASSETTE

[75] Inventor: Sinichi Saitou, Hachioji, Japan

[73] Assignee: Olympus Optical Company Limited, Tokyo, Japan

[21] Appl. No.: 160,669

[22] Filed: Jun. 18, 1980

[30] Foreign Application Priority Data

Jun. 18, 1979 [JP] Japan .............................. 54-83184[U]
Jun. 18, 1979 [JP] Japan .............................. 54-83185[U]

[51] Int. Cl.³ .......................... G03B 1/04; G11B 15/32
[52] U.S. Cl. ..................................... 242/198; 242/199
[58] Field of Search ............................... 242/197–200; 360/96, 93, 132

[56] References Cited

U.S. PATENT DOCUMENTS 4,000,519 12/1976 Turk ................................... 360/132
4,054,252 10/1977 Oishi et al. ......................... 242/199
4,231,532 11/1980 Popov et al. ........................ 242/199
4,232,350 11/1980 Ohta ................................... 360/132

Primary Examiner—Leonard D. Christian
Attorney, Agent, or Firm—Toren, McGeady and Stanger

[57] ABSTRACT

A tape cassette for use in a tape recorder having a head inserting window portion, a pair of hubs arranged in the cassette, a magnetic tape wound around these hubs, fed from one of these hubs and taken up to the other hub, turning rollers for guiding the tape along the window of the cassette, and a tape guide portion provided with a roller guide and a fixed guide adjacent to each other in front of the turning roller positioned on the side of feeding the tape so as to turn in the running direction of the tape as the tape is fed from the hub so as to be guided by the fixed guide through the roller guide.

1 Claim, 6 Drawing Figures

TAPE CASSETTE

BACKGROUND OF THE INVENTION

The present invention relates to a tape cassette for stabilizing tape running.

This kind of tape cassettes is, as shown in FIG. 1 constructed in such a manner that a pair of tape hubs 2, 3 are arranged in a cassette body 1 divided into upper and lower portions. A magnetic tape 4 is wound around one hub, for example a hub 2, and is guided along a window portion 1a on the side surface of the cassette body 1 and taken up to the other hub 3. In this case, in order to guide the magnetic tape 4 along the window portion 1a, there are provided turning rollers 5, 6 at the tape feeding side from the hub 2 and at the tape taken-up side to the hub 3, respectively. In FIG. 1, reference numeral 7 is a pad for slidingly contacting the tape 4 with the head surface with a predetermined pressure when a magnetic head (not shown) is inserted from the window portion 1a.

With the use of such tape cassette, if the tape 4 wound around the hub 2 is not in proper alignment during feeding of the tape 4 to the hub 3 deflection will occur in the tape in the widthwise direction. This deflection can be regulated by the roller 5 but it cannot be removed completely, so that tape deflection will occur at the head surface, thereby producing a track shift and considerably deteriorating the tape characteristics at the time of recording and reproduction. Recently, this type of tape cassette has been considered for use with video tape wherein higher tape speed is required (4.8 cm/sec in a compact cassette) thereby causing deflection during tape running to cause more conspicuous distortions and level change particularly in a cassette tape having a narrow track width wherein an azimuth shift is often generated.

SUMMARY OF THE INVENTION

It is an object of the present invention to eliminate the above described disadvantages of the conventional tape cassette.

It is another object of the present invention to provide a tape cassette for avoiding tape deflection during tape running by providing a tape guide portion for turning in the tape running direction at the preceding stage of a turning roller on the side of feeding of the tape.

It is further object of the present invention to provide a tape cassette for avoiding tape deflection during running by providing a turning guide turning in the tape running direction at the preceding stage of a turning roller on the side of feeding of the tape.

According to the present invention there is provided a tape cassette which comprises a cassette body having a head inserting window portion, a pair of hubs arranged in the body, a magnetic tape wound around these hubs, fed from one of these hubs and taken up to the other hub, turning rollers for guiding the tape along the window of the body, and a tape guide portion provided with a roller guide and a fixed guide adjacent to each other in front of the turning roller positioned on the side from which the tape is fed so as to turn in the running direction of the tape fed from the hub by the fixed guide through the roller guide. A pair of flange portions are provided at intervals almost equal to the width of the tape on at least the fixed guide in the tape guide portion.

A tape cassette according to the present invention comprises a cassette body having a head inserting window portion, a pair of hubs arranged in the body, a magnetic tape wound around these hubs, fed from one hub and taken up to the other hub, a turning roller for guiding the tape along the window portion of the body, and a turning guide for turning in the running direction of the tape which is fed from the hub and located in front of the turning roller positioned on the side from which the tape is fed. The turning guide is provided with a pair of flange portions at intervals almost equal to the width of the tape. The turning guide may be fixed to the cassette body or, alternatively it may be rotatable.

DESCRIPTION OF THE PREFERRED EMBODIMENT

Figure 1:
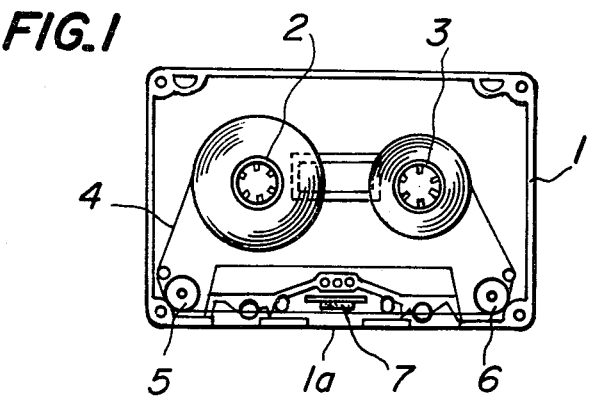
FIG. 1 is a schematic plan view showing a construction of one embodiment of a conventional tape cassette.

Referring now to the drawing one embodiment of a tape cassette according to the present invention will be explained.

Figure 2:
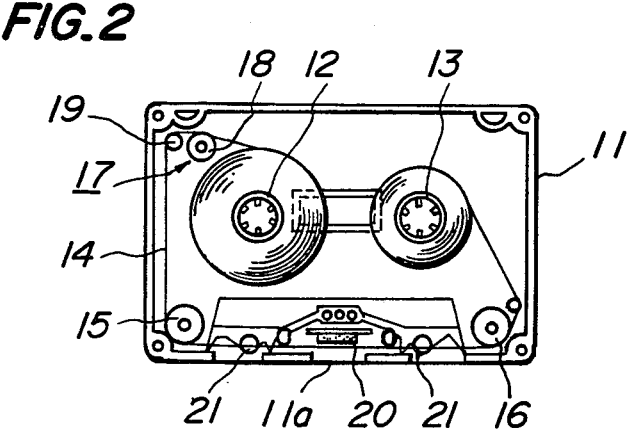
FIG. 2 is a schematic plan view showing a construction of one embodiment of a tape cassette according to the present invention.

FIG. 2 shows an embodiment of a tape cassette used for recording and reproduction in one direction of tape running.

In FIG. 2, reference numeral 11 is a cassette body divided into upper and lower portions, and this cassette body 11 is formed with a magnetic head inserting window portion 11a on one side surface. In the cassette body 11 are arranged a hub 12 at a tape feeding side and a hub 13 at a tape take-up side, with a magnetic tape 14 being wound around the hub 12 and being taken up by the hub 13. At corners on both sides of the window portion 11a of the cassette body 11 are provided turning rollers 15, 16, respectively. These turning rollers 15, 16 are used for guiding the tape 14 fed from the hub 12 along the window portion 11a.

At the preceding stage (corner portion of the cassette body 11 opposite to the turning roller 15 in the illustrated embodiment) of the turning roller 15 positioned on the side of feeding of the tape there is arranged a tape guide portion 17 turning in the running direction of the tape 14 fed from the hub 12.

Figure 3:
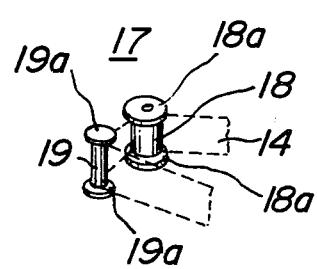
FIG. 3 is a perspective view showing a tape guide portion used in the tape cassette shown in FIG. 2.

The tape guide portion 17, as shown in FIG. 3, consists of a pair of guides rollers 18, 19 adjacent to each other, with the rotatable roller guide 18 being positioned on the side of the hub 12, while the fixed guide 19 is positioned on the side of the turning roller 15 and is secured to the cassette body 11. These guides 18, 19 are provided with a pair of flange portions 18a, 19a at intervals almost equal to the width of the tape 14, respectively.

Figure 4:
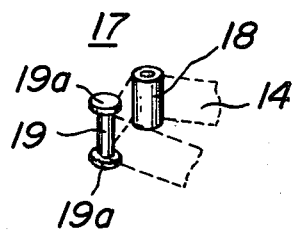
FIG. 4 is a perspective view showing another embodiment of the same tape guide.

The flange portion 18a can be eliminated from the guide 18 as shown in FIG. 4.

In FIG. 2, reference numeral 20 is a pad for slidably contacting the tape 14 against the head (not shown) with a predetermined pressure, and reference numeral 21 is a hole for inserting a capstan (not shown).

The operation of the tape cassette constructed as described above will be explained as follows. When the tape 14 is fed from the tape feeding side hub 12, the direction of the tape 14 is controlled by the fixed guide 19 through the roller guide 18 of the tape guide portion 17 and the tape 14 is fed to the turning roller 15, guided along the window portion 11a of the cassette body 11 by the roller 15 and the turning roller 16 and taken up to the take-up side hub 13.

If any deflection in the tape in the widthwise direction is produced at a portion a of the tape 14 fed from the hub 12, the tape 14 is fed to the tape guide portion 17 as is. Then, the tape 14 is fed to the fixed guide 19 through the roller guide 18, the running direction being controlled by the sliding action during turning in the running direction at the guide 19 and passing through the flange portion 19a, with the tape deflection being restrained to a large extent. In this case, the deflection of the tape 14 is also controlled by the flange portion 18a of the guide 18.

The tape 14 passed through the tape guide portion 17 is further controlled by the turning roller 15.

Thus, the deflection of the tape 14 at a portion B, i.e., the portion which runs along the window portion 11a of the cassette body 11, is essentially eliminated, so that the tape running direction thereafter becomes very stable.

The hub 12 changes in winding diameter of the tape 14 at the beginning and end. Therefore, if the tape guide portion 17 is composed of the fixed guide 19 only and the tape 14 is directly fed to the guide 19, a sliding area of the tape 14 and the fixed guide 19 is changed by the tape winding diameter of the hub 12, and the friction is also changed, so that the tape running is sometimes changed at the beginning and end when the tape 14 is at high speed. However, in the present invention, the roll guide 18 is arranged in front of the fixed guide 19 and the tape 14 is fed to the fixed guide 19 through the guide 18, so that even if the tape winding diameter of the hub 12 is changed, no frictional change is caused at the fixed guide 19, thereby constantly stabilizing the tape running both at the beginning and end of the tape winding.

Another embodiment of the present invention will be explained with reference to FIG. 5.

Figure 5:
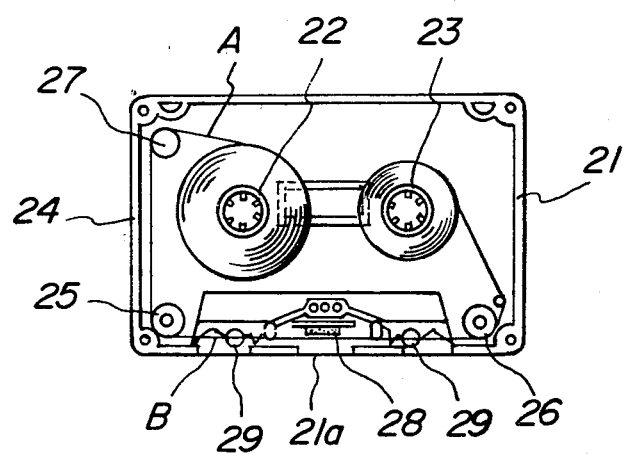
FIG. 5 is a schematic plan view showing a construction of another embodiment of the tape cassette according to the present invention.

In FIG. 5, reference numeral 21 is a cassette body divided into upper and lower portions, and the cassette body 21 is provided with a magnetic head inserting window portion 21a. In the cassette body 21 are arranged a tape feeding side hub 22 and tape take-up side hub 23 for taking up a magnetic tape 24 wound around the hub 22 to the hub 23.

At corners on both sides of the window portion 21a in the cassette body 21 are provided turning rollers 25, 26, respectively. The turning rollers 25, 26 are used for guiding the tape 24 fed from the hub 22 along the window portion 21a.

Figure 6:
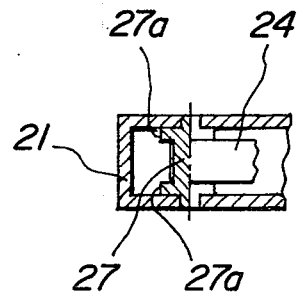
FIG. 6 is a sectional view showing a turning guide used in the tape cassette shown in FIG. 5.

In front of the turning roller 25 positioned at the tape feeding side (corner of the cassette body opposite to the turning roller 25 in the illustrated embodiment) is provided a turning guide 27 for controlling the running direction of the tape 24 fed from the hub 22. The guide 27, as shown in FIG. 6, is fixed to the cassette body 21 and is provided with a pair of flange portions 27a at intervals almost equal to the width of the tape 24. In this case, the turning guide 27 is preferably made small in friction coefficient on the tape sliding surface. Alternatively, the guide 27 may be rotable.

In FIG. 5, reference numeral 28 is a pad for pressing the tape 24 in sliding engagement against a head (not shown) with a predetermined pressure, and reference numeral 29 is a hole for inserting a capsten (not shown) therein.

The operation of the tape cassette constructed as described above will be explained as follows. Now, when the tape 24 is fed from the tape feeding side hub 22, the tape 24 is guided by the turning guide 27, fed to the turning roller 25, guide along the window portion 21a of the cassette body 21 by the roller 25 and the turning roller 26 and taken up to the winding side hub 23.

If a deflection in the vertical direction, i.e., deflection in the tape in the widthwise direction, is caused at a portion A of the tape 24 fed from the hub 22, the tape 24 is fed to the turning guide 27 as is. Then, the running direction of the tape 24 is controlled by the sliding contact during movement in the running direction and by passing between the flange portions 27a, and the tape deflection is eliminated to a large extent. The tape 24 passed through the guide 27 is again controlled by the turning roller 25.

Thus, the deflection of the tape 24 at a portion B, i.e., the portion run along the window portion 21a of the cassette body 21, is almost eliminated and the tape running thereafter becomes very stable.

According to such construction, the tape deflection during the tape running can be removed and stable tape running at the window portion of the cassette body can be obtained, so that sliding against the head is constantly stable and the characteristic at the time of recording and reproduction is significantly improved. Moreover, the tape running change at the beginning and end of the tape winding can be prevented, so that the tape running is constantly stabilized. Thus, the present invention is very effective when tape speed is increased.

The present invention is not limited to the above embodiments, but can be modified without departing from the scope of the present invention. For example, in the above embodiment, the tape running direction used for reproduction is in one direction only as explained, but the present invention can be used for operation in two directions. In this case, it is preferable to provide the tape guide portion 17 or the turning guide 27 on the winding side also. In the above embodiment, the tape guide portion 17 or the turning guide 27 is provided at a corner of the cassette body 11 or 21 opposite to the turning roller 15 or 25, but it is preferable to provide it at any place where the tape running direction can fully be controlled in front of the turning roller 15 or 25 positioned at the tape feeding side.

As stated in the foregoing, according to the present invention, it becomes possible to provide a tape cassette which can positively remove any tape deflection during the tape running by providing a tape guide portion for guiding the tape running direction in front of the turning roller.

What is claimed is:

1. A tape cassette comprising:
    a generally quadrilateral cassette body formed with four corners having a head inserting window portion on a first side thereof;

a pair of tape hubs arranged in said body;

a magnetic tape wound around said hubs and fed from one of said hubs to the other of said hubs;

a pair of turning rollers each located respectively at a first and a second of said four corners of said cassette body for guiding said tape between said turning rollers along a path extending generally parallel to said first side of said cassette body past said window portion, said first and said second corners being located at opposite ends of said first side; and a tape guide portion located at a third of said four corners at the end of a second side of said cassette opposite said first side and generally parallel thereto;

said tape being wound to extend from one of said tape hubs directly to and about said guide portion and from said guide portion to one of said turning rollers parallel to a third side of said cassette body which extends perpendicularly to said first and second sides thereof between said guide portion and said one turning roller;

said tape guide portion consisting essentially of a rotating roller guide member and a fixed guide member adapted to direct said tape from said one hub so as to guide the running direction of said tape by operation of said fixed guide member and said rotating roller guide member, said rotating roller guide member being arranged to receive said tape directly from said one hub, said roller guide member being thereby located between said fixed guide member and said one tape hub taken in the running direction of said tape.

* * * * *